Patented Feb. 27, 1934

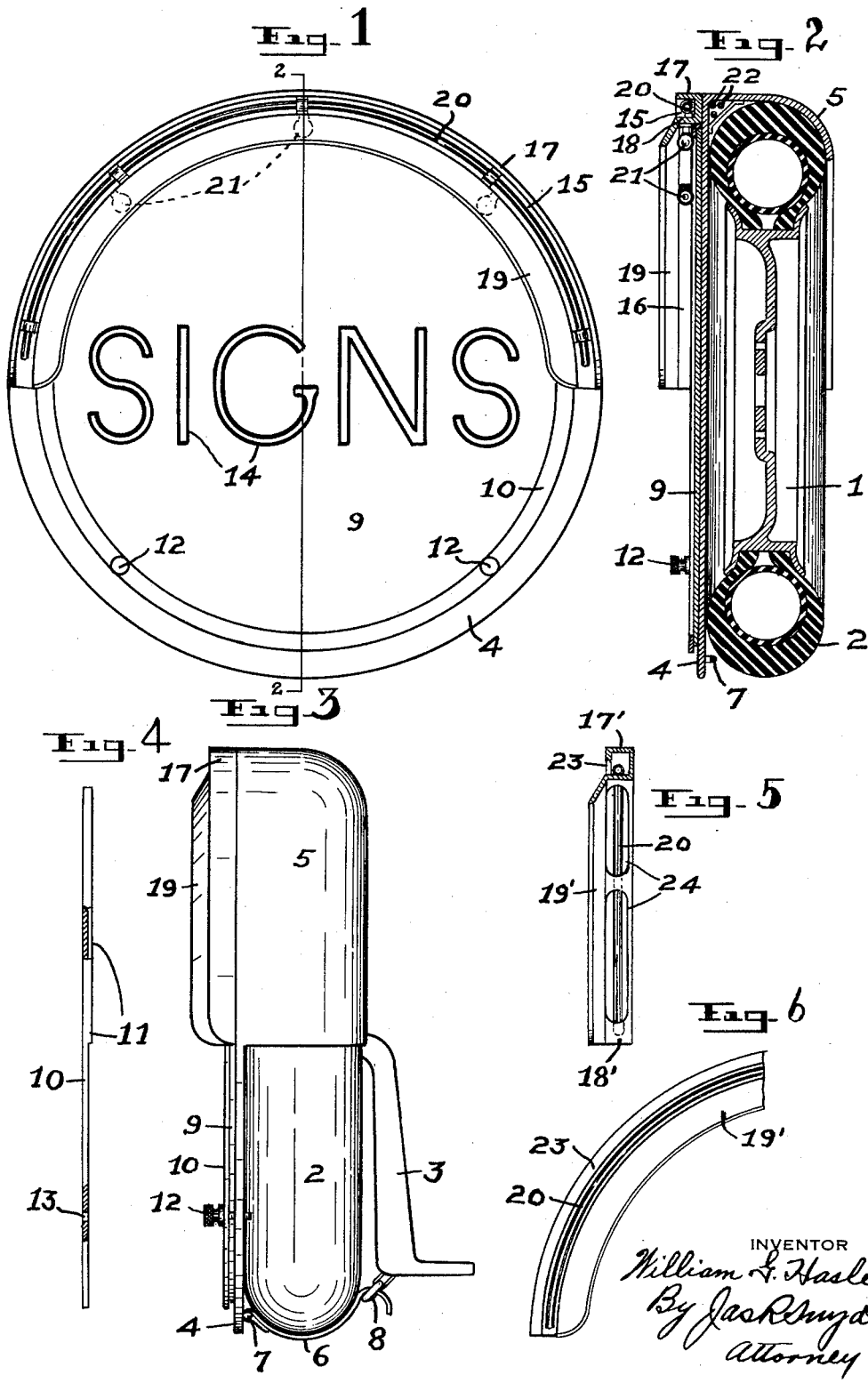

1,948,578

UNITED STATES PATENT OFFICE 1,948,578

VEHICLE ADVERTISING SIGN

William G. Hasley, Pittsburgh, Pa.

Application September 30, 1931
Serial No. 565,955

6 Claims. (Cl. 40—130)

My invention relates to an advertising sign and while primarily designed for being mounted on the spare tires of motor vehicle wheels, particularly taxi-cabs, motor busses and other public conveyances, it is obvious that the sign may be attached to any other suitable part of a motor vehicle.

Important objects of the invention are to provide an advertising sign of the character described, which may be readily secured to a motor vehicle spare tire or removed from the latter, which is illuminated rendering same clearly legible at night as well as in daylight, which embodies a conveniently replaceable advertising display plate, and which serves as a cover for protecting the tire carrying same.

Further objects of the invention are to provide a device of the class stated, which is simple in its construction and arrangement, durable and efficient in its use, compact, attractive and distinctive in appearance, and comparatively inexpensive to manufacture, install and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a rear view of a vehicle advertising sign constructed in accordance with the invention.

Figure 2 is a sectional view on line 2—2, Figure 1.

Figure 3 is a side view of the device mounted upon a motor vehicle wheel.

Figure 4 is a side view of the securing ring partially in cross section.

Figures 5 and 6 are, respectively, cross sectional and fragmentary rear views of a modified form of reflector channel.

Referring in detail to the drawing 1 represents a motor vehicle wheel, including a pneumatic tire 2, and of the type now commonly employed on motor vehicles.

My improved sign is particularly adapted for attachment to the spare wheel and associated tires ordinarily carried at the rear end or at the sides of a motor vehicle, by a bracket 3, for emergency purposes.

The present invention comprises a flat, circular supporting plate 4 having a diameter preferably, though not essentially, commensurate to the diameter of the tire 2. The supporting plate 4 is positioned flatly against the rearward side of the tire 2, and the upper one-half portion thereof is provided with a suitably curved, forwardly disposed apron 5, which engages and overlaps the upper one-half portion of the tire 2, as clearly shown in Figure 3.

The apron 5 serves to maintain the supporting plate 4 in position against the tire 2 and in conjunction with said supporting plate 4 provides an adequate protective cover for the tire 2. The supporting plate 4 is further secured in position by a tie strap 6, which passes around the lower part of the tire 2 and has one end connected in a loop 7 fixed in the lower end of the supporting plate 4. The other end of the tie strap 6 is adjustably connected in a buckle 8, which is secured to the tire bracket 3. It is, of course, evident that any other suitable attaching elements may be employed for securing the supporting plate 4 in position against the tire 2, without departing from the spirit of the invention.

In describing my invention the terms "forward" and "rearward" are applied thereto as relative to the disposition of the motor vehicle and with respect to its attachment on the rearward end of the latter, while the terms "inner", "outer", "forwardly" and "rearwardly" are applied to the device and parts thereof relatively to their positions with respect to the axial center of the associated motor vehicle wheel.

A circular advertising display plate 9 is positioned flatly against the rearward side of the supporting plate 4, and is preferably somewhat less in diameter than the latter. The display plate 9 is securely held in its position on the supporting plate 4 by a securing ring 10. The upper one-half part of the securing ring 10 is provided with an outer wall 11, which is permanently fixed to the supporting plate 4. The lower one-half part of the securing ring 10 is free and not attached to the supporting plate 4.

The securing ring 10 engages and overlaps the peripheral edge margin of the display plate 9, and the latter is placed in position by forcing same upwardly between the securing ring 10 and the supporting plate 4. The display plate 9 is fastened in position by a pair of thumb screws 12, which extend in spaced relation to each other through respective apertures 13 provided therefor in the securing ring 10 and engage in threaded apertures formed in supporting plate 4. By tightening the screws 12 the free lower portion of the securing ring 10 is clamped against the display plate 9 and the latter is thereby held against movement on the supporting plate 4. The release of the screws 12 allows the convenient removal of the display plate 9 to effect the replacement of the latter when required.

The display plate 9 is preferably constructed from thin sheet metal or any other suitable sheet material capable of withstanding the exposure to which the display plate 9 is necessarily subjected. The display plate 9 is provided with the desired indicia or advertising matter 14, which is preferably printed or otherwise applied thereon in colorful prominence to attract attention thereto.

A pair of arcuate reflector channels, respectively, indicated at 15 and 16, extend along and are secured to the peripheral edge margin of the upper one-half portion of the supporting plate 4 on the rearward side of the latter. The reflector channels 15 and 16 are preferably constructed from a unitary strip of sheet metal, which is shaped to provide the narrow outer wall 17, the inner wall 18 of corresponding width, and the reflector flange 19. The latter is formed integral with the rearward edge of the inner wall 18 and projects rearwardly and inwardly from the latter at an angle with respect to the transverse disposition of the associated inner wall 18.

The channel 15 is formed by the inner and outer walls 17 and 18 and has its open side disposed rearwardly. The channel 16 is formed by the inner wall 18 and the flange 19 complemented by the supporting plate 4, and has its open side disposed inwardly directly above the display plate 9. The entire interior areas of the channels 15 and 16 are suitably prepared to provide reflector surfaces for reflecting the light from the lighting elements mounted within the channels 15 and 16.

A tubular lighting element 20, preferably in the form of a neon or analogous lighting structure, is securely mounted in any suitable manner in the channel 15 and extends arcuately throughout the length of the latter. As the channel 15 is open on its rearward side, the light from the lighting element 20 will necessarily be reflected rearwardly and visible only from a point rearward thereof. The purpose of preferably employing a lighting element 20 of the type and in the manner stated, is that the latter is equally discernible either at night or in daytime, and its distinctiveness is calculated to excite the attention of the observer to other features of the device.

A plurality of electric lamps 21 are mounted on the inner side of the inner wall 18 and extend into the channel 16. The lamps 21 are suitably arranged and spaced relatively to each other in the channel 16. The lamps 21 are provided for illuminating the display plate 9 and the advertising matter 14 displayed thereon, particularly at night. The interior reflector surface of the channel 16 will augment the illumination of the display plate 9 by directing the rays of light from the lamps 21 directly onto the latter. The reflector flange 19 further serves as a protective guard shielding the display plate 9 from the weather elements.

It is apparent that the source of electrical supply together with control elements therefor, for operating the lighting element 20 and the lamps 21, is suitably located in and carried by the motor vehicle equipped with the present invention. Associated electrical conductors 22 may be housed directly inward of the apron 5 at its connection with the supporting plate 4, as illustrated in Figure 2, or may be arranged in any other proper manner to best meet conditions found in practice.

The modified form of reflector channels, illustrated in Figures 5 and 6, differs from the preferred form hereinbefore described, only in that the rear free edge of the outer wall 17' thereof is provided with an inwardly disposed reflector flange 23, and that the inner wall 18' is formed with comparatively large oblong openings 24. The modified form of reflector channels is designed for obviating the necessity of using the lamps 21 for illuminating the display plate 9, as the latter is illuminated, through the openings 24, directly by the lighting element 20. The rays of light from the latter are directed through the said openings 24 by the reflector flange 23 and augmented by the reflector flange 19'.

It is obvious that the actual requirements found in practice may necessitate certain mechanical variations in the form, proportions and details of construction of the invention. It is, therefore, not intended to limit the invention to the embodiment thereof herein illustrated and described, but rather to define such limitations in the appended claims.

The present invention provides a most durable and attractive device of its kind, which may be successfully employed for effectively displaying advertisements of any description and which permits the convenient replacement of such advertisements when desired.

What I claim is:

1. A display sign comprising a flat circular supporting plate adapted to be attached against one side of the tire of a motor vehicle wheel, a display plate, means for removably securing the latter against said supporting plate, a pair of reflector channels carried by said supporting plate, an illuminating element mounted in each of said reflector channels, one of said pair of reflector channels having its open side disposed rearwardly, and the other of said pair of reflector channels having its open side disposed directly above said display plate.

2. A display sign comprising a flat circular supporting plate adapted to be attached against one side of the tire of a motor vehicle wheel, a display plate, means for removably securing the latter against said supporting plate, a pair of reflector channels carried by said supporting plate, an illuminating element mounted in each of said reflector channels, one of said pair of reflector channels having its open side disposed rearwardly and the other of said pair of reflector channels having its open side disposed directly above said display plate, said pair of reflector channels extending along the edge margin of said supporting plate.

3. A display sign comprising a flat circular supporting plate adapted to be attached against one side of the tire of a motor vehicle wheel, a display plate, means for removably securing the latter against said supporting plate, a pair of reflector channels carried by said supporting plate, an illuminating element mounted in each of said reflector channels, one of said pair of reflector channels having its open side disposed rearwardly, and the other of said pair of reflector channels having its open side disposed directly above said display plate, said pair of reflector channels being formed from an integral strip of sheet material and extending along the edge margin of the upper one-half portion of said supporting plate.

4. In combination, a display sign comprising a supporting plate adapted to be attached against one side of the tire of a motor vehicle wheel, a display plate, means for removably securing the latter against said supporting plate, reflector member carried by said supporting plate, and an illuminating element mounted in said reflector member, said reflector member visibly displaying said illuminating element from the rearward side thereof and further directing the light from said element downwardly to illuminate said display plate, said reflector member and said illuminating element being disposed on the peripheral edge margin of said supporting plate.

5. In combination, a display sign comprising a supporting plate adapted to be attached against one side of the tire of a motor vehicle wheel, a display plate, means for removably securing the latter against said supporting plate, reflector member carried by said suporting plate, and an illuminating element mounted in said reflector member, said reflector member visibly displaying said illuminating element from the rearward side thereof and further directing the light from said element downwardly to illuminate said display plate, said reflector member and said illuminating element being disposed along the peripheral edge margin of the upper portion of said supporting plate.

6. In combination, a display sign comprising a supporting plate adapted to be attached against one side of the tire of a motor vehicle wheel, a display plate, means for removably securing the latter against said supporting plate, a reflector member carried by said supporting plate, and an illuminating element mounted in said reflector member, said reflector member visibly displaying said illuminating element from the rearward side thereof and further directing the light from said element to illuminate said display plate, said reflector member and said illuminating element being disposed on the peripheral edge margin of said supporting plate.

WILLIAM G. HASLEY.